(12) United States Patent
Zhang et al.

(10) Patent No.: US 8,392,870 B2
(45) Date of Patent: Mar. 5, 2013

(54) TWO-CHIP CO-DESIGN AND CO-OPTIMIZATION IN THREE-DIMENSIONAL INTEGRATED CIRCUIT NET ASSIGNMENT

(75) Inventors: Yifan Zhang, Shanghai (CN); Gary K. Yeap, Fremont, CA (US); Yonghua Liao, Chengdu (CN); Dalei Wang, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/019,280

(22) Filed: Feb. 1, 2011

(65) Prior Publication Data

US 2012/0198409 A1   Aug. 2, 2012

(51) Int. Cl.
*G06F 17/50* (2006.01)
(52) U.S. Cl. .......... 716/138; 716/54; 716/119; 716/126; 716/132; 716/137
(58) Field of Classification Search ............ 716/54, 716/119, 126, 132, 137, 138
See application file for complete search history.

(56) References Cited

U.S. PATENT DOCUMENTS 6,948,138 B1 * 9/2005 Shen ............................. 716/114
2006/0001152 A1 * 1/2006 Hu ................................ 257/707

* cited by examiner

*Primary Examiner* — Thuan Do
*Assistant Examiner* — Brian Ngo
(74) *Attorney, Agent, or Firm* — Bever, Hoffman & Harms, LLP; Jeanette S. Harms (57) ABSTRACT

A method of generating optimized input/output (IO) pair and inter-chip connection combinations for two chips is described. In this method, first and second designs for two chips can be specified. Then inter-chip signals based on the first and second designs can be specified. IO pairs for the first and second chips can be determined based on the inter-chip signals. At this point, electrical contacts between micro-bumps (MBs) of the first and second chips can be formed. Inter-chip paths with through-silicon-vias (TSVs) and MBs of the first and second chips can also be formed. At this point, the costs of assigning the IO pairs to the inter-chip paths can be determined. A cost matrix can be built based on these costs. A bipartite matching algorithm can be applied to the cost matrix to determine the optimized IO pair and inter-chip path combinations.

18 Claims, 11 Drawing Sheets

TWO-CHIP CO-DESIGN AND CO-OPTIMIZATION IN THREE-DIMENSIONAL INTEGRATED CIRCUIT NET ASSIGNMENT

BACKGROUND OF THE PRESENT INVENTION

1. Field of the Invention

The present invention relates to stacked (i.e. three-dimensional) integrated circuits (ICs) (also called chips herein), and in particular to processing the designs of two chips simultaneously to achieve global optimum solutions using a standard single-chip electronic design automation (EDA) tool.

2. Related Art

In three-dimensional (3D) IC technology, multiple dies can be stacked vertically with inter-chip connections using through-silicon-vias (TSVs) and micro-bumps (MBs). The TSV is a standard 3D object that forms electrical interconnection between a front metal 1 layer and a back metal 1 layer of a chip. Thus, the TSV can be used to carry a signal (e.g. power or other signals) from one side of a chip to its other side. Note that the back metal 1 layer has no transistors, unlike the front metal 1 layer. Note further that the TSVs are on the order of 5-10 microns wide, which based on a standard cell size of 1 micron, can be considered a valuable chip resource.

The MB is a spherical piece of metal on the top-most metal layer or on the bottom-most back metal layer of the chip. MBs are used to form the electronic contacts between two neighboring chips in a stack. Note that although a MB is described below, other embodiments of the two-chip co-design technique may use other types of "bumps", which could be larger or smaller than MBs. Therefore, the term MB, as used herein, can be broadly described as any bump.

The locations of TSVs are typically formed in an array, which spacing may vary based on the design. In current state of the art designs, thousands of TSVs may be needed. In one embodiment, the TSVs of the chip may be placed every 50 microns. Although theoretically the MBs may be placed directly above the TSVs, in actual practice, the MBs are placed adjacent the TSVs, with the connections (i.e. wires) therebetween being part of the RDL (re-distribution layer). In general, once a design is designated, the TSVs and MBs can be considered a "given" with minimal or no user discretion allowed for TSV and MB placement.

The net assignment flow for 3D IC designs currently includes a single-chip net assignment step, which assigns and connects TSVs to MBs to form intra-chip paths. An inter-chip net assignment step then assigns and connects inter-chip signals to these paths while attempting to minimize total wire length.

Notably, the inter-chip net assignment is a two-chip co-design and co-optimization problem. After the connection on one chip is determined, the connection on the other chip can be derived. The objective of inter-chip net assignment is to optimize the total wire length of all the inter-chip nets between the two chips.

Thus, the problem is, given two chips and the inter-chip paths between them, finding an assignment of inter-chip signals to inter-chip paths while minimizing the total weighted wire length. Optimally, wires on signal routing layers and wires on RDL routing layers should be weighted differently in the wire length calculation.

SUMMARY OF THE INVENTION

A method of generating optimized input/output (IO) pair and inter-chip connection combinations for two chips is described. In this method, first and second designs for first and second chips can be specified. Inter-chip signals based on the first and second designs can then be specified. IO pairs for the first and second chips can be determined based on the inter-chip signals. At this point, electrical contacts between micro-bumps (MBs) of the first and second chips can be formed. Inter-chip paths with through-silicon-vias (TSVs) and MBs of the first and second chips can also be formed.

At this point, the costs of assigning the IO pairs to the inter-chip paths can be determined. A cost matrix can then be built based on these costs. Using a computer, a bipartite matching algorithm can be applied to the cost matrix to determine the optimized IO pair and inter-chip path combinations. In one embodiment, the bipartite matching algorithm is an expanded Munkres algorithm.

Forming the inter-chip paths can include, for each inter-chip path, designating a contact formed by two MBs. When the MB is on a front side, a through-silicon-via (TSV) pin connected to the MB can be added to the path. Another TSV pin of that TSV can be added to the path. These steps, i.e. designating the contact, adding the TSV pin, and adding another TSV pin when another contact is present, can be repeated for each contact.

Determining the costs of assigning the IO pairs to the inter-chip paths can include calculating the locations of the IO ports of the IO pairs. For each IO pair, a first planar distance between one IO port and a head node of its associated inter-chip path can be calculated. This first planar distance can be multiplied with a redistribution layer weight to generate a first cost. A second planar distance between another IO port and a tail node of the associated inter-chip path can be calculated. This second planar distance can be multiplied with a signal layer weight to get a second cost. The first and second costs can be added to get a total cost for that IO pair and inter-chip path combination. Building the cost matrix can include listing the total costs for all of the IO pair and inter-chip path combinations for the first and second designs.

DETAILED DESCRIPTION OF THE DRAWINGS

As described in further detail below, inter-chip paths can be built using a two-chip co-design technique that takes into account TSVs, MBs, and input/output (IO) pairs (i.e. ports) on both chips. Inter-chip net assignments can be made by applying a bipartite matching algorithm. In one embodiment, a specific cost function employed in the bipartite matching algorithm can allow different type nets to have different weights in wire length calculations. Using the two-chip co-design technique can advantageously allow the two chips to be simultaneously processed, thereby achieving global optimum solutions in a standard EDA tool heretofore designed for single chips.

Figure 1:
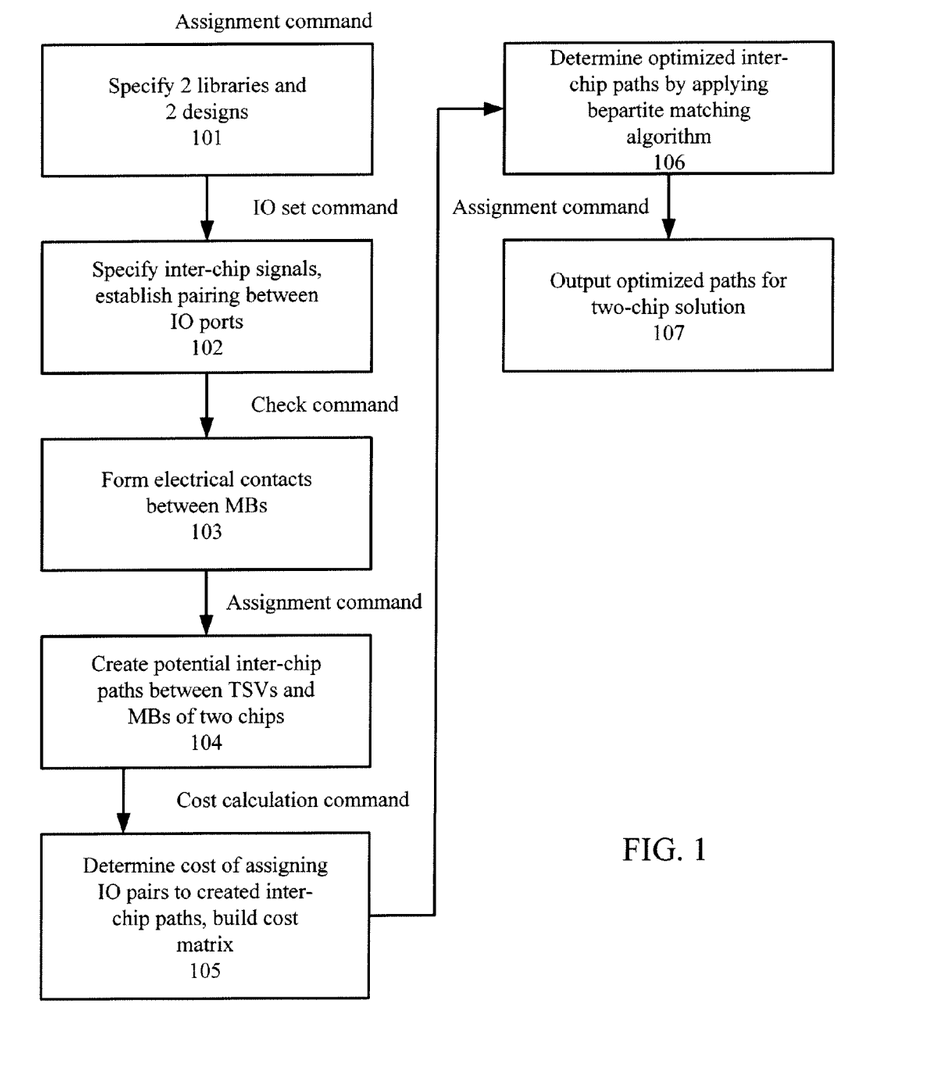
FIG. 1 illustrates an exemplary two-chip co-design technique.

FIG. 1 illustrates an exemplary two-chip co-design technique 100. In step 101, the two libraries and the two designs to be included in the stacked IC configuration can be specified. In one embodiment, a command assign_interchip_nets (hereinafter the "assignment command") can be introduced into the design compiler. This assignment command can open those two designs for writing at the same time and, after analysis and computation, save the results back to the two designs when finished.

In step 102, the inter-chip signals can be specified using another command set_interchip_connections (10 set command), which establishes a one-to-one pairing between IO ports of the two designs. Each IO pair is a logical connection between the two chips to be implemented. In general, between the two chips, there is a set of n IO pairs to be implemented, wherein n is a positive integer.

In step 103, the electrical contacts between the MBs of the two chips can be formed. To ensure correct formation, a check command_check_interchip_physical_contact (check command) can be run.

In step 104, the potential inter-chip paths, and in particular the connections between TSVs and MBs on the two chips, can be created using a command assign_tsv_to_micro_bump (assignment command). As defined herein, each inter-chip path is an electrical connection that begins on one chip and ends at the other chip. Notably, there is a set of m inter-chip paths that are pre-determined from the physical layout of the MBs, TSVs, and the physical contacts of the two chips. In one embodiment, for simplicity of computation, the objects in each path can be considered electrically equivalent.

Figure 2:
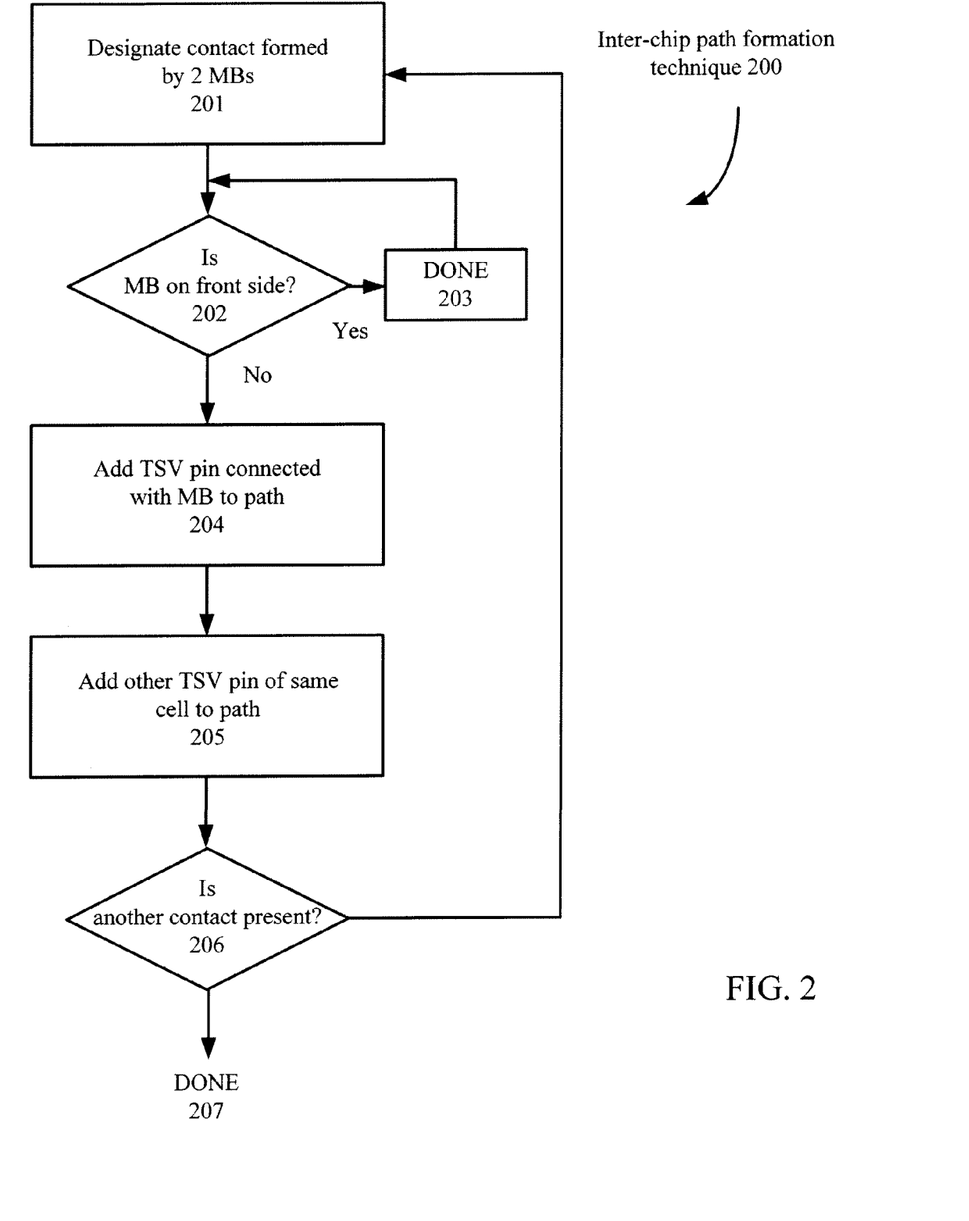
FIG. 2 illustrates an inter-chip path formation technique.

FIG. 2 illustrates an exemplary inter-chip path formation technique 200 for building an inter-chip path. Step 201 can designate a contact formed by two MBs, each MB being from one of the two designs. For each MB in the contact, step 202 can determine if that MB is on the front side of the chip. If so, then step 203 can characterize that the inter-chip path for chip 1 is DONE and return to step 202 for the other MB (which would by default be on the backside of chip 2). If that MB is not on the front side, then step 204 can add the TSV pin connected with that MB to the path. Step 205 can add the other pin of the same TSV cell to the path. At this point, technique 200 has created one inter-chip path between the two designs, e.g. the path starting from the front side TSV pin or MB of chip (i.e. a first chip) and ending at the front side TSV pin or MB of chip 2 (i.e. a second chip).

Step 206 can determine if another contact between the two chips (based on the designs) is present. If so, then steps 201-205 can be repeated. If not, then inter-chip path formation technique 200 can end at step 207. Note that when inter-chip path formation technique 200 ends, a complete set of potential inter-chip paths between the two chips has been built.

Referring back to FIG. 1, step 105 can determine the cost of assigning IO pairs to the inter-chip paths created in step 104. In one embodiment, different weights for wires on the signal routing layers and wires on the RDL routing layer can be assigned, thereby allowing the user to "tune" the assignments. Note that the nets from or to MBs solely in the top metal layer of the chip are considered to be of the RDL routing type. Non-RDL nets are considered to be of the signal routing type. The assigned weights are then honored during subsequent wire length calculations. In one embodiment, a RDL weight can be set higher than a signal weight, thereby ensuring that technique 100 emphasizes optimizing nets from or to MBs in the metal layer of chip 1. This relative weighting can advantageously facilitate subsequent RDL routing.

Note that step 105 can take into account two sets of objects: the set of inter-chip paths created in step 104 and a set of IO pairs. Each IO pair indicates an inter-chip logical connection (e.g. connecting ports A and B, wherein port A is on chip 1 and port B is on chip 2). In one embodiment, this logical connection can be specified by the user. In another embodiment, this logical connection can be automatically specified using an EDA tool based on the given designs (which are accessed in step 101).

After the set of IO pairs and the set of inter-chip paths are built, a cost calculation command can create an nxm matrix, called the cost matrix herein. In the cost matrix, each element represents the cost of assigning one of the n IO pairs to one of the m inter-chip paths (wherein nsm).

Figure 3:
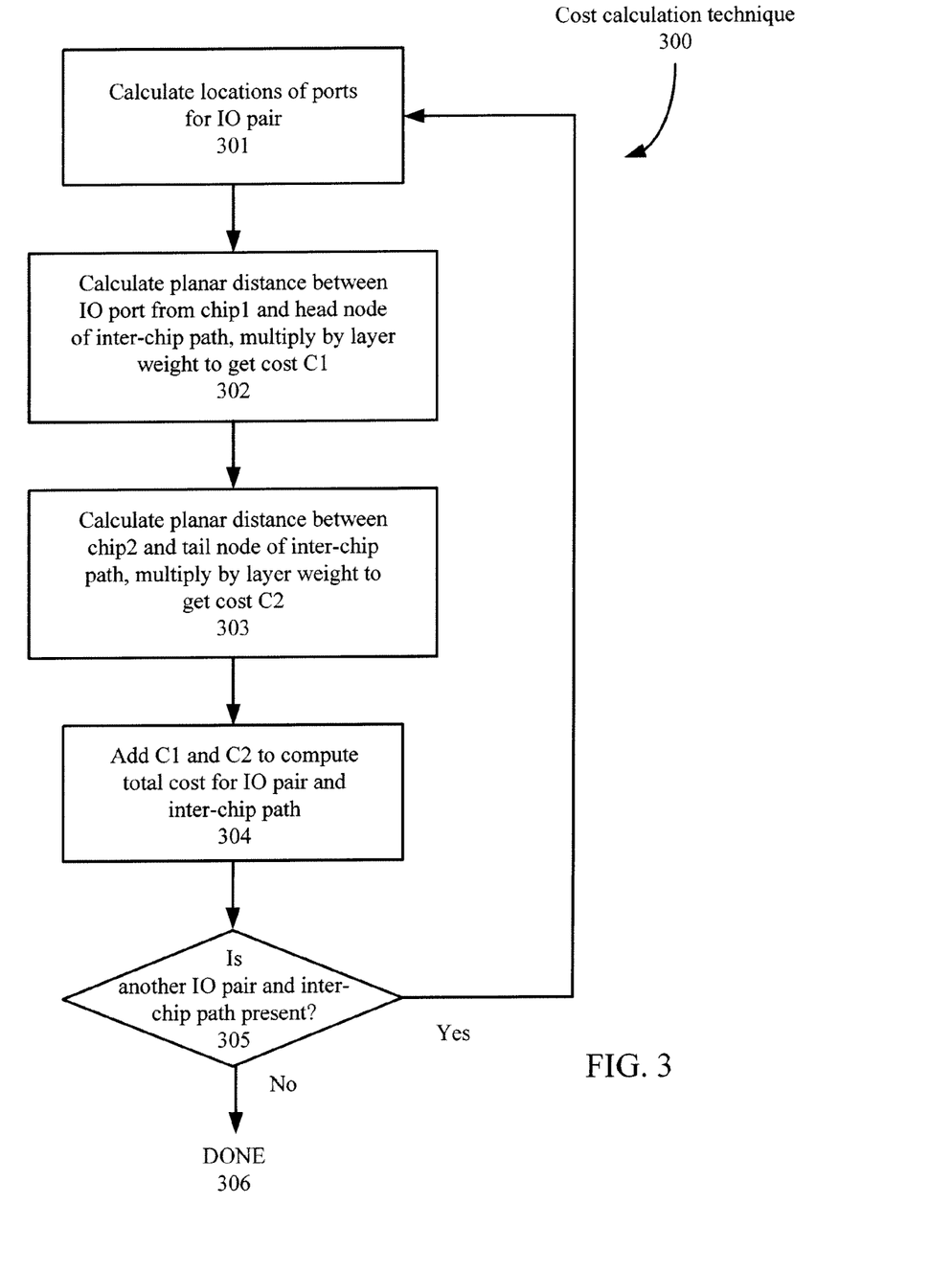
FIG. 3 illustrates a cost calculation technique for assigning IO pairs to inter-chip paths.

Given an IO pair and an inter-chip path, the cost can be calculated using a cost calculation technique 300, which is shown in FIG. 3. Step 301 can calculate the locations of the IO ports. Step 302 can calculate the planar distance between the IO port from chip 1 and the head node of the inter-chip path (the head node being one of a MB or a TSV). If the head node is a MB, then multiply that planar distance with the weight associated with the RDL layer to calculate cost C1. Otherwise, multiply the planar distance with the weight associated with the signal layer nets.

Step 303 can calculate the planar distance between the IO port from chip 2 and the tail node of the inter-chip path (the tail node being one of a MB or a TSV). If the tail node is a MB, then multiply the planar distance with the weight associated with the RDL layer to calculate the cost C2. Otherwise, multiply the planar distance with the weight associated with the signal layer nets. In one embodiment, the weighting differential between the RDL and signal layers is 10:1.

Step 304 can add costs C1 and C2 to obtain a total cost for a specific IO pair and a specific inter-chip path. If another IO pair and inter-chip path combination is present and not yet analyzed, as determined in step 305, then the steps 301-304 can be repeated to build a full cost matrix for all IO pair and inter-chip path combinations. If the costs for all IO pair and inter-chip path combinations have been computed, then step 306 ends technique 300 (DONE).

Referring back to FIG. 1, step 106 can then apply a bipartite matching algorithm to the cost matrix to find an exclusive one-to-one matching between IO pairs and inter-chip paths with the minimum total cost. A bipartite matching algorithm essentially determines the connection between one vertex in one set (e.g. the set of IO pairs) and one vertex in another set (e.g. the inter-chip paths). In one embodiment, the Munkres algorithm can implement the bipartite matching algorithm to obtain optimal quality of results (QoR). Note that the Munkres algorithm is a known $O(n^3)$ deterministic algorithm that can find an n-to-n matching problem. In accordance with the present invention, the Munkres algorithm can be advantageously expanded in step 106 in order to solve an n-to-m matching problem.

Figure 4:
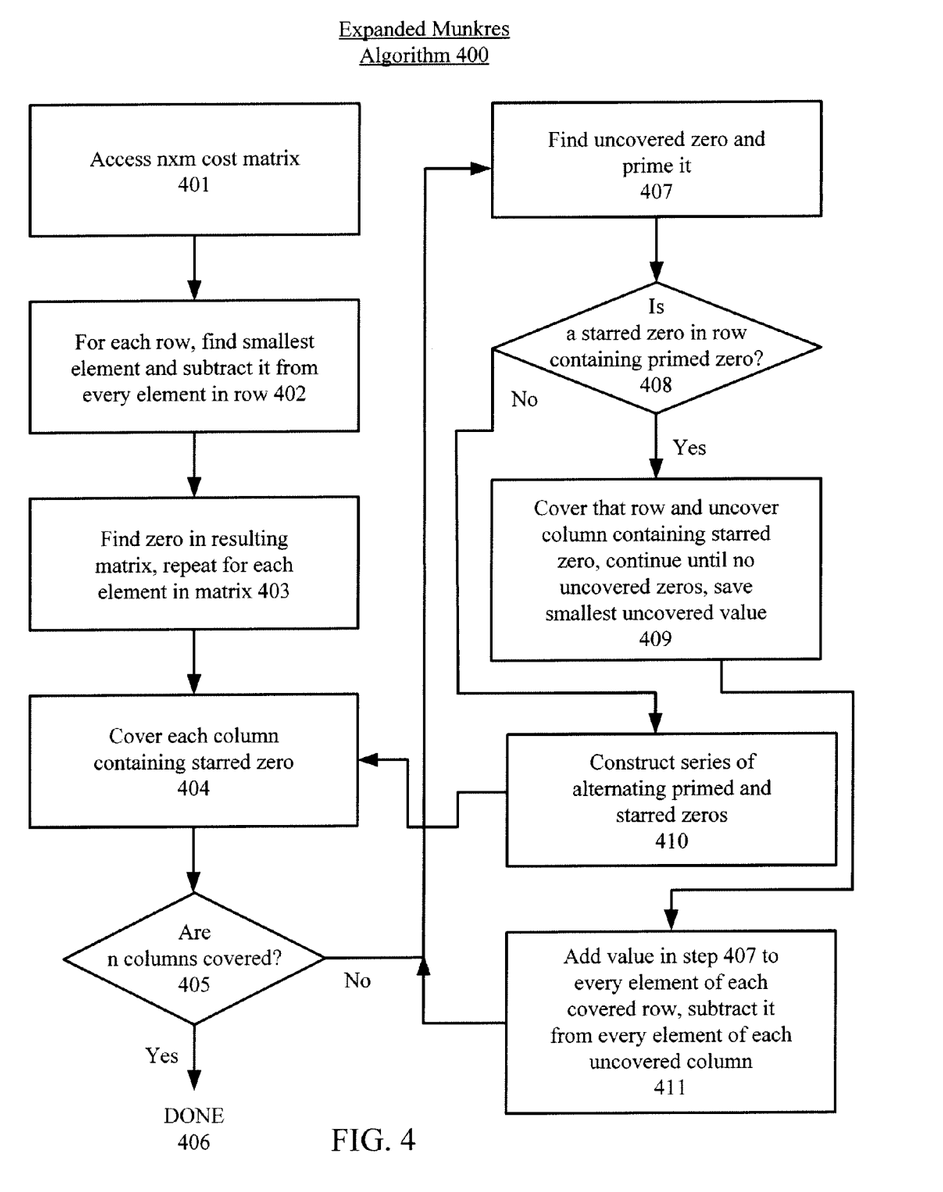
FIG. 4 illustrates an expanded Munkres algorithm that can be used to determine optimized inter-chip paths for the IO pairs.

FIG. 4 illustrates an expanded Munkres algorithm 400 that can be used to determine optimized inter-chip paths for the IO pairs. Step 401 accesses the nxm cost matrix, wherein each element of the matrix represents the cost of assigning one of n IO pairs to one of m inter-chip paths. Note that n≦m is a design constraint.

Step 402 finds the smallest element in a row and subtracts it from every element in its row. This subtraction is performed for each row in the matrix. Step 403 finds a zero (Z) in the resulting matrix. If there is no starred zero in its row or column, then star Z. Step 403 is repeated for each zero in the matrix.

Step 404 covers each column containing a starred zero. If n columns are covered, as determined in step 405, then the starred zeros describe a complete set of unique assignments and technique 400 is characterized as DONE in step 406. Otherwise, technique 400 proceeds to step 407.

Step 407 finds each uncovered zero and primes it. Note that a zero is primed in a similar manner to being starred, i.e. putting a notation on the zero (like "0'" or "0*"). If there is no starred zero in the row containing a primed zero, as determined by step 408, then technique 400 proceeds to step 410. Otherwise, in step 409, that row is covered and the column containing the starred zero is uncovered. Step 409 is repeated until there are no uncovered zeros left. At this point, the smallest uncovered value is saved and technique 400 proceeds to step 411.

Step 410 constructs a series of alternating primed and starred zeros as follows. Let Z0 represent the uncovered primed zero found in step 407, Z1 represent the starred zero in the column of Z0 (if any), and Z2 represent the primed zero in the row of Z1 (there will always be one). Step 410 can continue to find a Z3 (i.e. a starred zero in the column of Z2) and a Z4 (i.e. a primed zero in the row of Z3) to construct a series (e.g. 0'-0*-0'-0* . . . 0*-0') until the series terminates at a primed zero that has no starred zero in its column. At this point, each starred zero of the series can be unstarred, each primed zero of the series can be starred, all primes can be erased, and every line in the matrix can be uncovered. Then, expanded Munkres algorithm 400 returns to step 404.

Step 411 adds the value found in step 407 to every element of each covered row, and subtracts it from every element of each uncovered column. At this point, the expanded Munkres algorithm 400 returns to step 407. When the expanded Munkres algorithm 400 reaches DONE (step 406), the assignment pairs are indicated by the positions of the starred zeros in the cost matrix. If C(i,j) is a starred zero (wherein C is the matrix, i is a row designator, and j is a column designator), then the element associated with row i is assigned to the element associated with column j.

Referring back to FIG. 1, after applying the bipartite matching algorithm, step 107 can output the optimized inter-chip paths for the IO pairs. Note that the two-chip co-design technique 100 can quickly find global optimized solutions in O(n3) runtime. For example, for 1000 IO pairs, a global optimized solution can be found in 5-6 minutes.

Figure 5A:
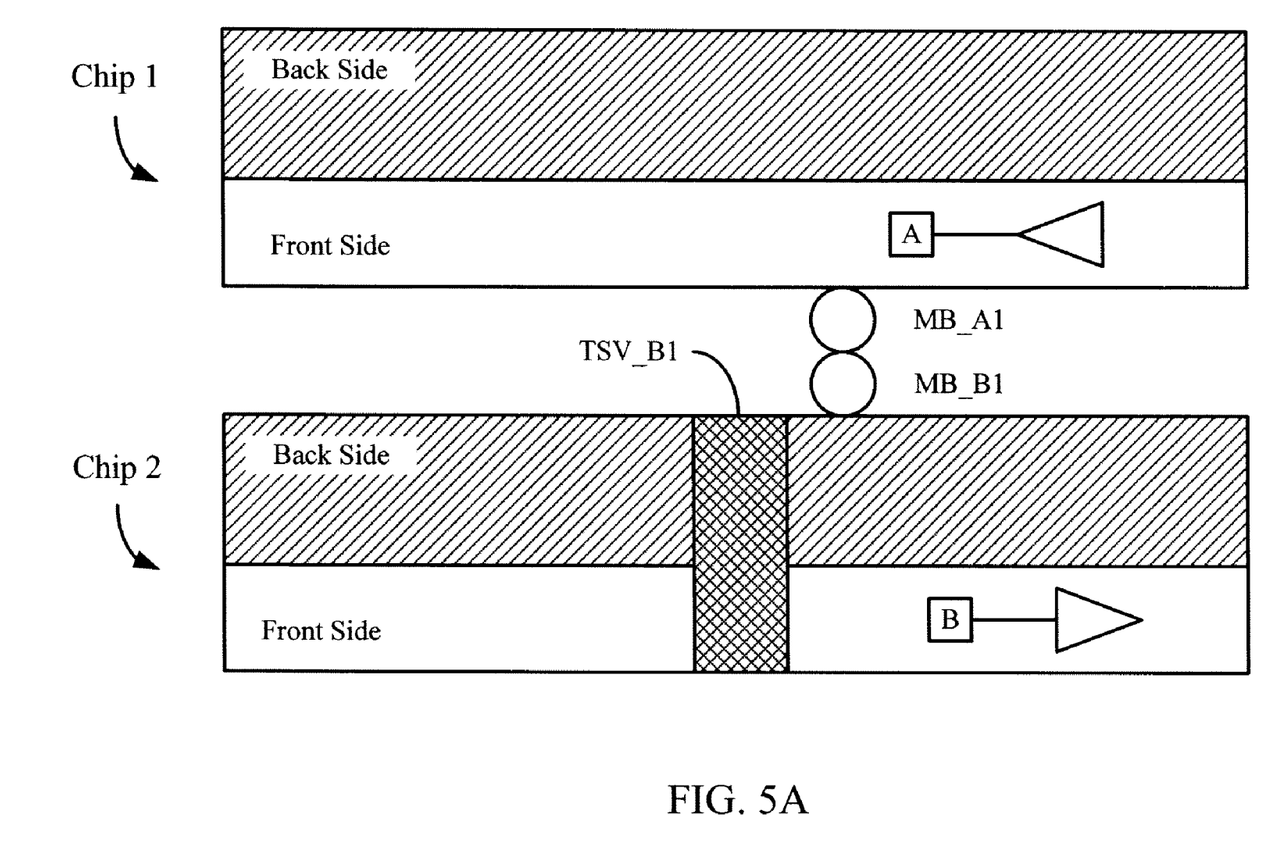
FIG. 5A illustrates an exemplary inter-chip path formation between two chips.
Figure 5B:
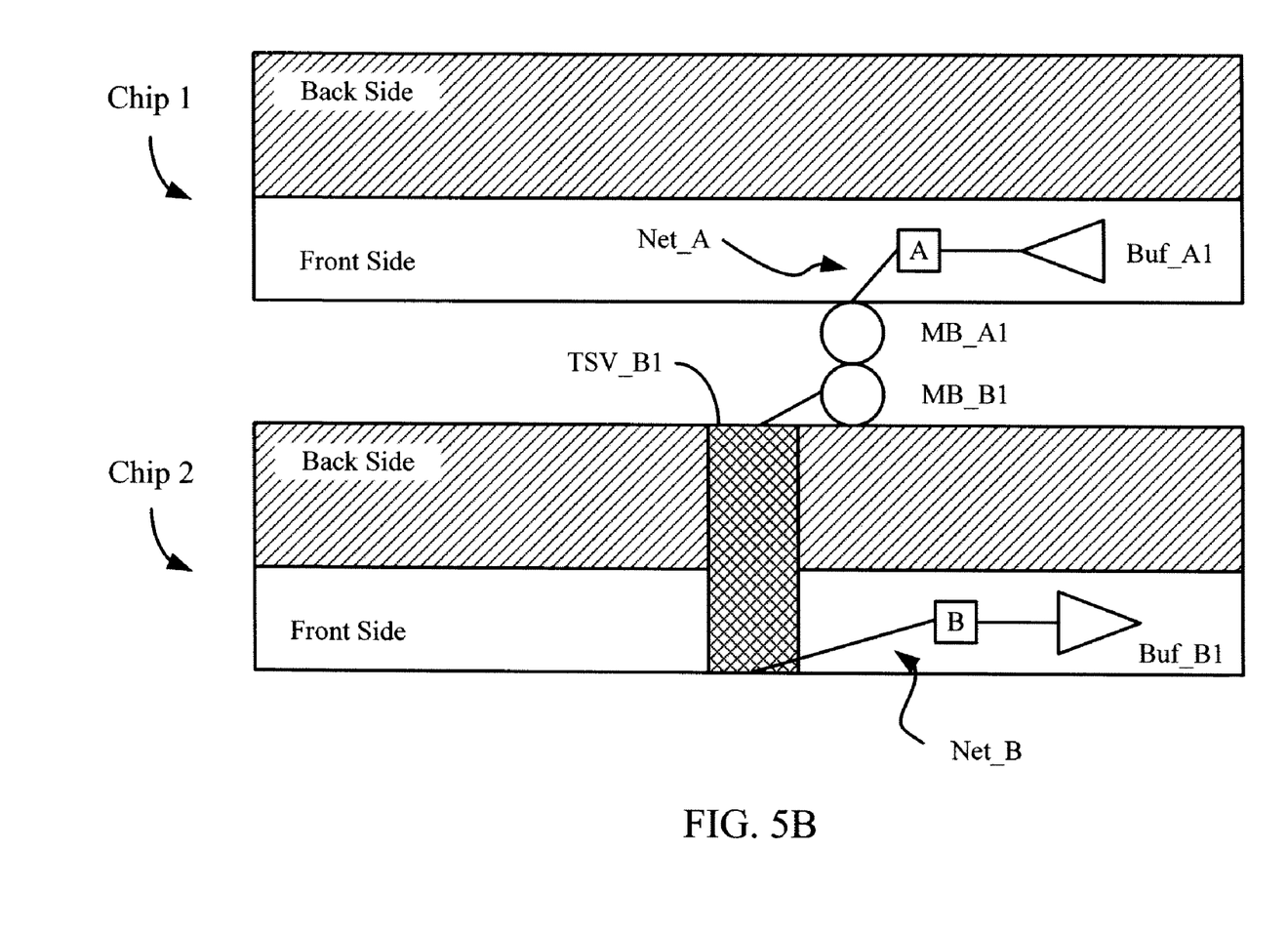
FIG. 5B illustrates how to calculate the cost of assigning an IO pair to an inter-chip path.

FIG. 5A illustrates the simplified designs for two chips, i.e. chip 1 and chip 2. The designs include ports A and B with corresponding MBs (MB_$A_1$ and MB_B1, respectively) and a TSV. FIG. 5B illustrates an exemplary inter-chip path formation for chips 1 and 2. Referring also to FIG. 2, a contact can be formed using MB_A1 (associated with chip 1) and MB_B1 (associated with chip 2) (wherein the contact is formed between the MBs, but is not shown for simplicity) (step 201). Note that MB_A1 is on the front side of chip 1, as determined by step 202. Therefore, step 203 can stop for chip 1.

In contrast, MB_B1 is on the back side of chip 2. Therefore, step 204 can add the back side pin of its connected TSV to the path (wherein this pin is located at an end of the TSV and provides an exterior interface to chip 2, also called a back port herein). Therefore, the path at this point includes MB_A1+ MB_B1+TSV_B1/back_port (also called head node). Step 205 can then add the other pin of the TSV cell (TSV_B1/ front_port (also called tail node), which is at the other end of the TSV) to the path, i.e. MB_A1+MB_B1+TSV_B1/ back_port+TSV_B1/front_port.

To calculate the cost of connecting IO pair (A B) and inter-chip path TSV, and referring also to FIG. 3, port A takes the location of pin Buf_A1 (specifically, its output terminal) and port B takes the location of pin Buf_B1 (specifically, its input terminal)(step 301). In step 302, a first planar distance between the pin Buf_A1/output and the center point of MB_A1 can be determined. In one embodiment, the first planar distance can also include the distance from the center point of MB_B1 to TSV_B1/back-port. This first planar distance can be multiplied by the RDL layer weight to generate a first net cost Net_A. In step 303, a second planar distance between the pin Buf_B1/input and TSV_B1/front_port can be determined. This second planar distance can be multiplied by the weight of the signal layer to generate a second net cost Net_B. A total cost associated with the IO pair (A B) and inter-chip path TSV can be computed by adding Net_A and Net_B in step 304.

Figure 5C:
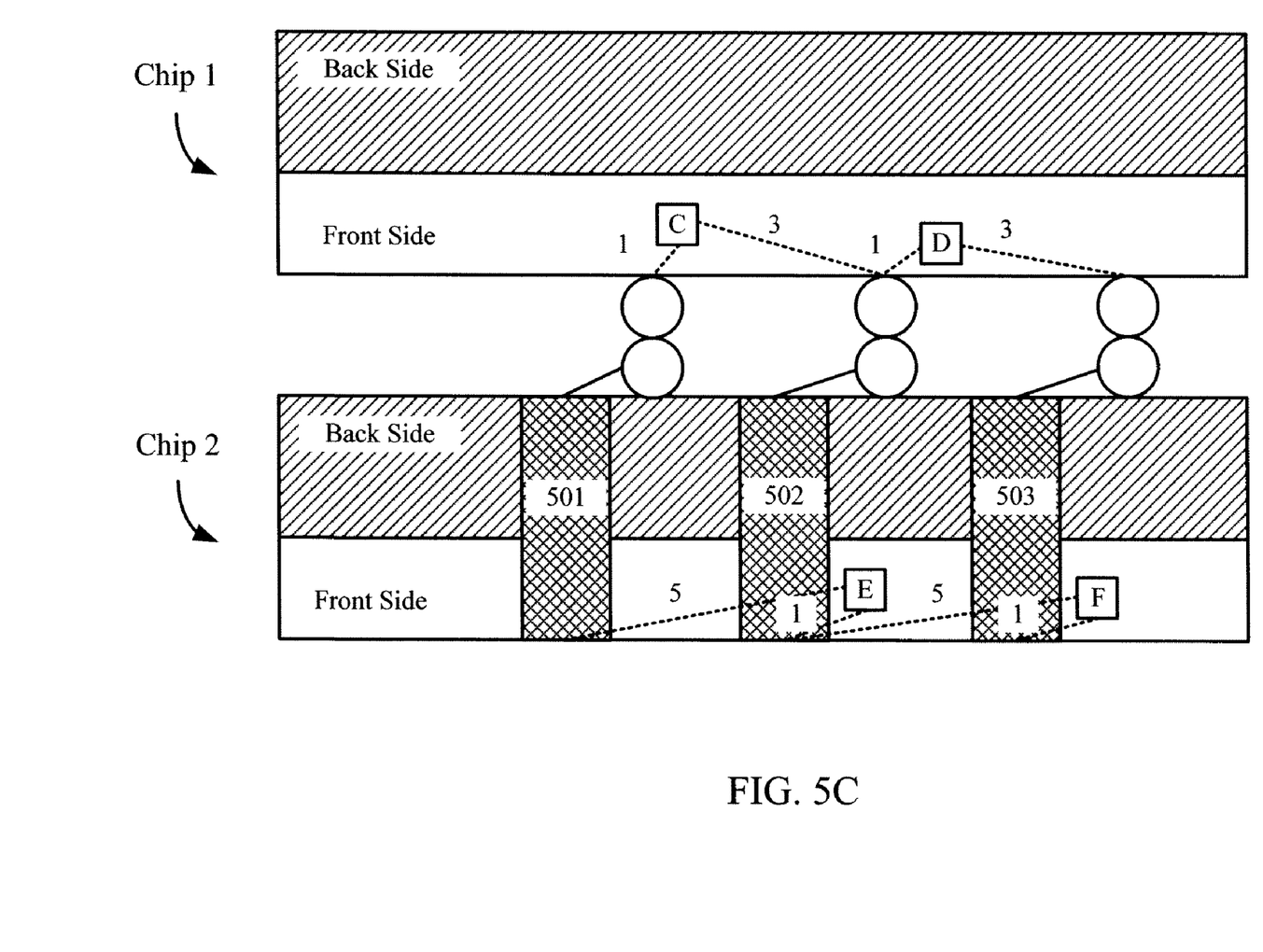
FIG. 5C illustrates how to build an exemplary cost matrix for two IO pairs and three inter-chip paths.

FIG. 5C illustrates exemplary costs of assigning IO pairs (C E) and (D F)(wherein C, D, E, and F are ports) to three inter-chip path 501, 502, and 503. As shown in FIG. 5C, port C could be connected to either of inter-chip paths 501 and 502, whereas port D could be connected to either of inter-chip pats 502 and 503. Similarly, port E could be connected to either of inter-chip paths 501 and 502, and port F could be connected to either of inter-chip paths 502 and 503. Table 1 indicates the costs calculated using cost calculation technique 300 (FIG. 3) for the specific IO pair/inter-chip path combinations. For simplicity, both the RDL and signal weights are assumed to be equal to 1.

TABLE 1

| Calculation of Cost Matrix | | | |
|---|---|---|---|
| | Inter-chip path 501 | Inter-chip path 502 | Inter-chip path 503 |
| IO pair (C E) | 1 + 5 = 6 | 3 + 1 = 4 | 12 |
| IO pair (D F) | 12 | 1 + 5 = 6 | 3 + 1 = 4 |

Figure 5D:
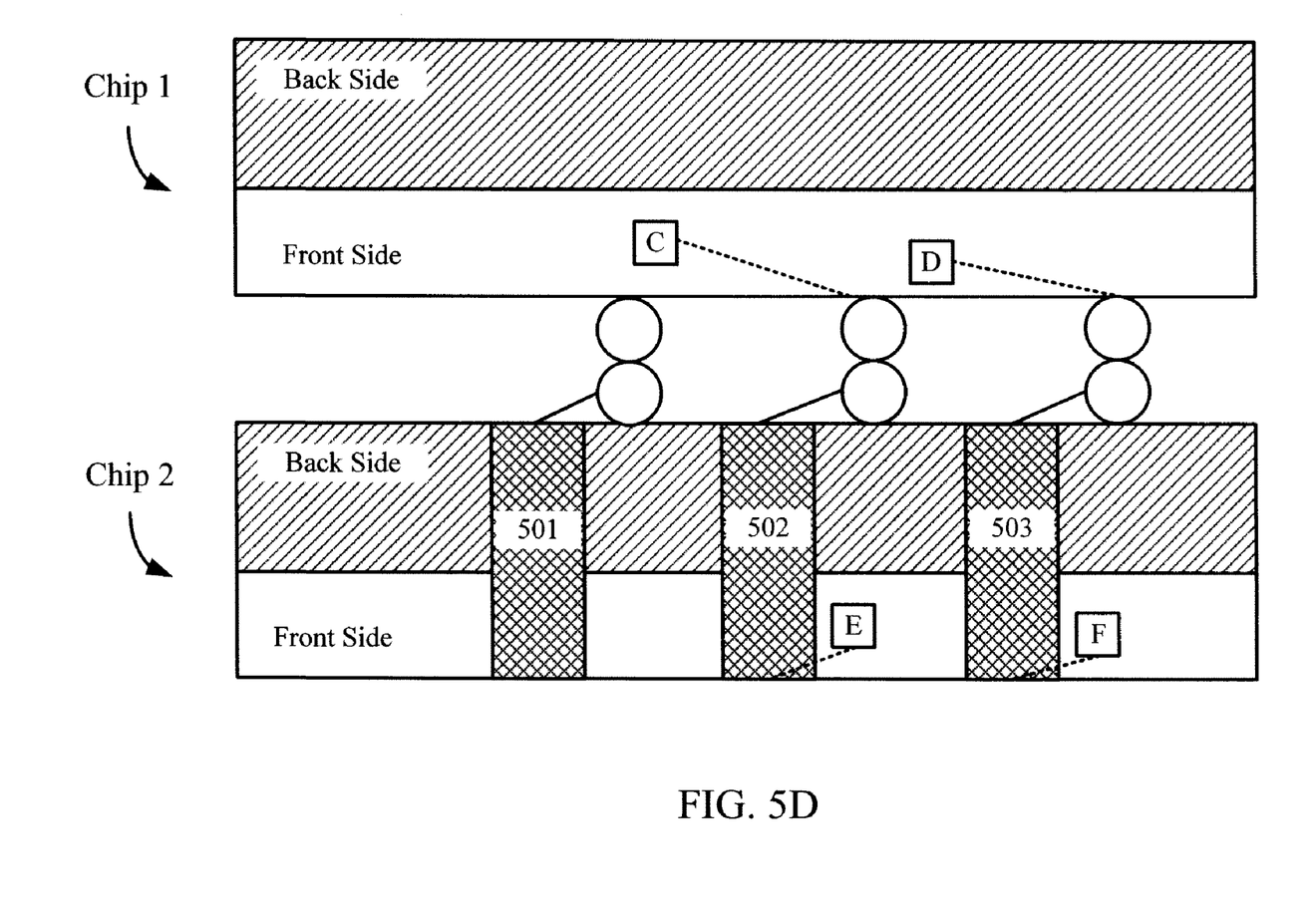
FIG. 5D illustrates the optimized inter-chip paths (determined using the expanded Munkres algorithm) for the two IO pairs of FIG. 5C.

After applying Munkres algorithm to the above cost matrix, the optimal assignment can be identified. Referring to Table 1, the inter-chip path 502 is identified as being the optimal assignment for IO pair (C E), whereas the inter-chip path 503 is identified as being the optimal assignment for IO pair (D F).

Figure 5E:
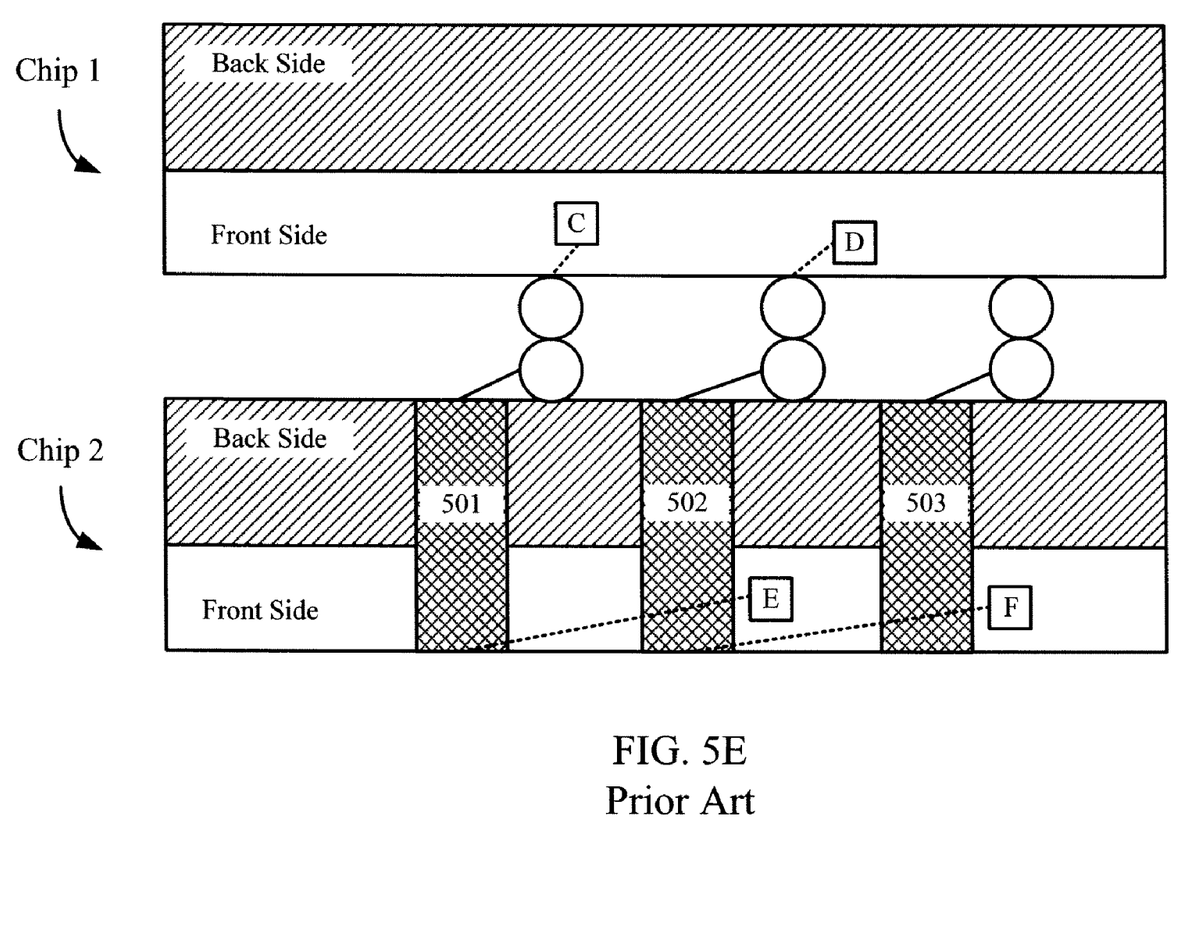
FIG. 5E illustrates the inter-chip paths designated for the two IO pairs using conventional techniques.

Note that if chip 1 is assigned first and then derive the connections on chip 2, the resulting non-optimal assignment could include inter-chip paths 501 and 502, which is shown in FIG. 5E. This non-optimal assignment using inter-chip paths 501 and 502 and referring to Table 1 would have a total cost of 12 (3+1+3+5) (noting that for the value of 5, there is no need to go through a port). This non-optimal result is typical in conventional two-chip architectures because the assignment for the first chip tends to be "greedy", i.e. overly aggressive, in minimizing wire length, thereby significantly increasing the possibility of poor assignments for the second chip. In contrast, the two-chip co-design technique 100 can advantageously consider the routing on both chips to determine the optimized inter-chip path and IO combinations.

Figure 6:
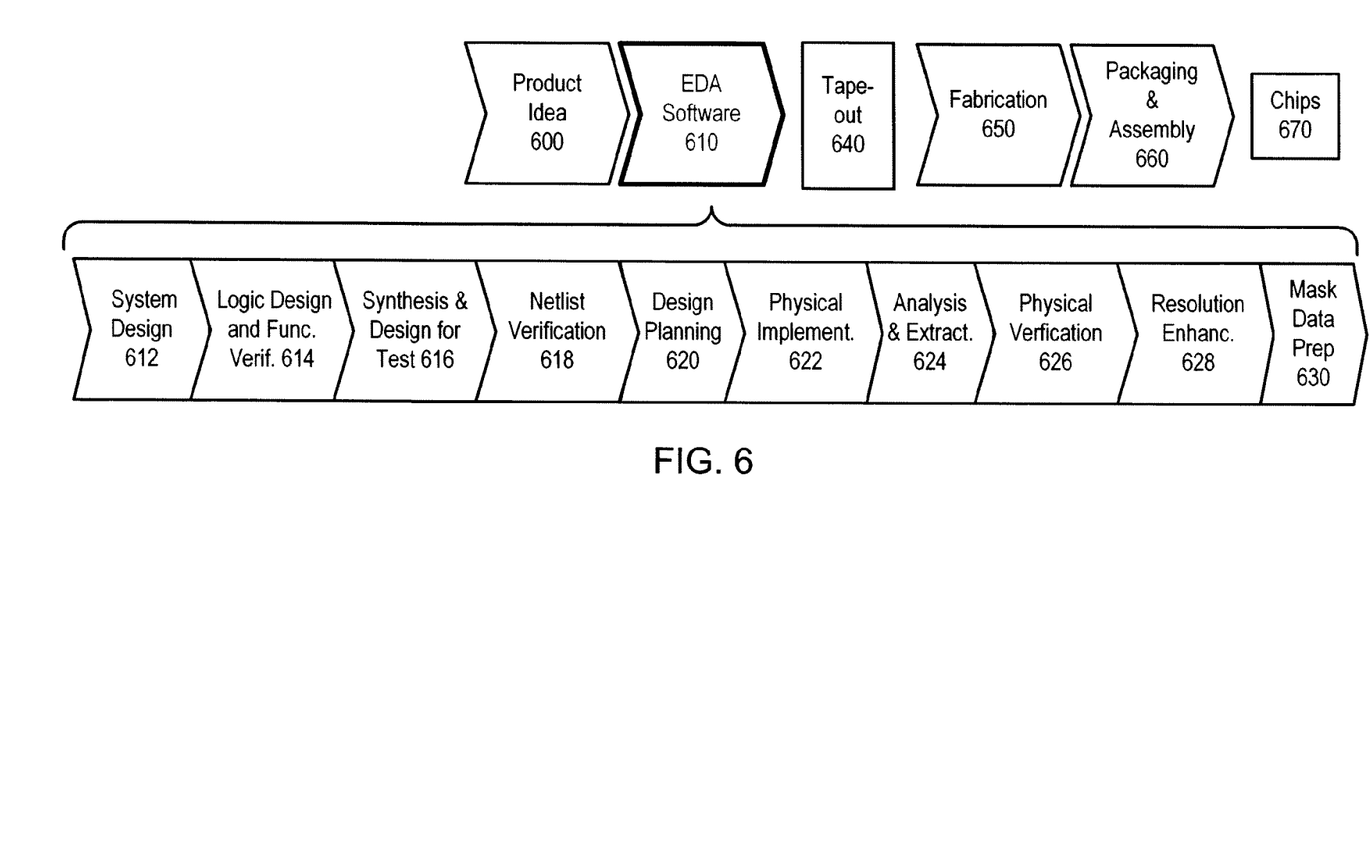
FIG. 6 illustrates a simplified representation of an exemplary digital ASIC design flow, which can include a two-chip co-design technique.

FIG. 6 illustrates a simplified representation of an exemplary digital ASIC design flow, which can include the above-described two-chip co-design technique. At a high level, the process starts with the product idea (step 600) and is realized in an EDA software design process (step 610). When the design is finalized, it can be taped-out (event 640). After tape out, the fabrication process (step 650) and packaging and assembly processes (step 660) occur resulting, ultimately, in finished chips (result 670).

The EDA software design process (step 610) is actually composed of a number of steps 612-630, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 610) will now be provided:

System design (step 612): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 614); At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 616): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 618): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 620): Here, an overall floorplan for the chip is constructed and analyzed for timing and top-level routing. Exemplary EDA software products from Synopsys, Inc. that can be used at this step include Astro and IC Compiler products. In one embodiment, the two-chip co-design and optimization technique described above can be used in step 620.

Physical implementation (step 622): The placement (positioning of circuit elements) and routing (connection of the same) occurs at this step. Exemplary EDA software products from Synopsys, Inc. that can be used at this step include the Astro and IC Compiler products. In one embodiment, the two-chip co-design and optimization technique described above can be used in step 622.

Analysis and extraction (step 624): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 626): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 628): This step involves geometric manipulations of the layout to improve manufacturability of the design. Exemplary EDA software products from Synopsys, Inc. that can be used at this step include Proteus, ProteusAF, and PSMGen products.

Mask data preparation (step 630): This step provides the "tape-out" data for production of masks for lithographic use to produce finished chips. Exemplary EDA software products from Synopsys, Inc. that can be used at this step include the CATS(R) family of products.

The above-described two-chip co-design technique can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Note that although a face-to-back two-chip architecture is described above, the two-chip co-design technique 100 is equally applicable to face-to-face and back-to-back architectures.

Although illustrative embodiments of the invention have been described in detail herein with reference to the accompanying figures, the embodiments described herein are not intended to be exhaustive or to limit the invention to the precise forms disclosed. As such, many modifications and variations will be apparent.

For example, the above-described IO ports are assumed to have known locations, which are particularly well-suited for inclusion into the bipartite matching algorithm. However, some designs may include multiple terminals on one or more chips.

Figure 7:
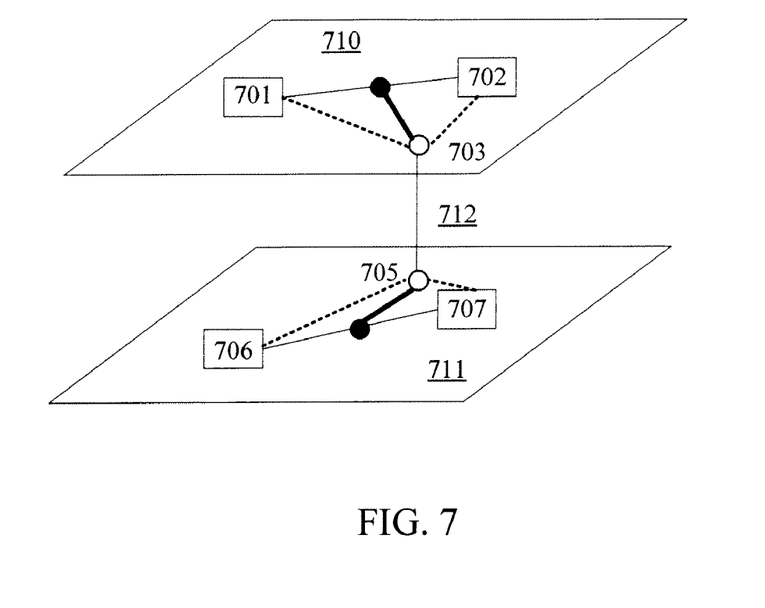
FIG. 7 illustrates exemplary multi-terminal configurations for two chips and exemplary locations for calculating costs.

FIG. 7 illustrates an exemplary design including IO ports 701 and 702 driving a single node 703 on a first chip 710, and a single node 705 feeding two IO ports 706 and 707 on a second chip 711. In one embodiment, for such multi-terminal configurations, the location of the center of gravity of the drivers (or buffers) (shown as black circles) associated with the ports can be used for purposes of the bipartite matching algorithm (i.e. determining the distance to TSV 712). That is, representative locations can be designated for the IO set (i.e. the expanded IO pair) in order to calculate the associated cost for the cost matrix. Note that if the IO port does not have a terminal and is a dangling IO, then the IO can be assumed to be anywhere and its wire length can therefore be ignored.

Figure 8:
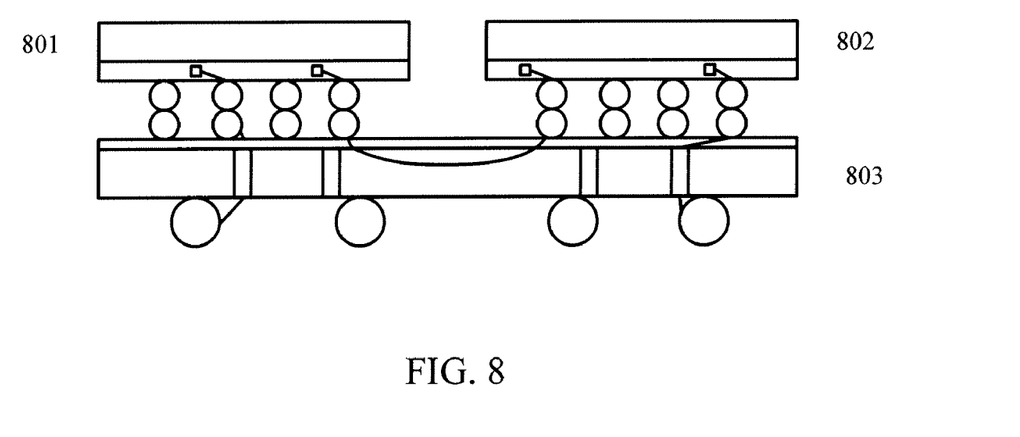
FIG. 8 illustrates an exemplary logic chip and interposer configuration.

In one embodiment, the two-chip co-design technique described above can also be applied to interposers, i.e. chips that have top and bottom metal layers, but no logic devices formed in the top metal layer. FIG. 8 illustrates an exemplary stacked chip formation including a first chip (including logic devices) 801, a second chip (including logic devices) 802, and an interposer 803.

Therefore, it is intended that the scope of the invention be defined by the following Claims and their equivalents.

The invention claimed is:

1. A method of generating optimized input/output (IO) pair and inter-chip connection combinations for two chips, the method comprising:
    specifying a first design for a first chip and a second design for a second chip;
    specifying inter-chip signals based on the first and second designs;
    establishing IO pairs for the first and second chips based on the inter-chip signals;
    forming electrical contacts between micro-bumps (MBs) of the first and second chips;
    forming inter-chip paths with through-silicon-vias (TSVs) and MBs of the first and second chips;
    determining costs of assigning the IO pairs to the inter-chip paths, the costs including a first cost associated with a redistribution layer and a second cost associated with a signal layer;
    building a cost matrix based on the costs; and
    using a computer, applying a bipartite matching algorithm to the cost matrix to determine the optimized IO pair and inter-chip path combinations,
    wherein building the cost matrix includes listing the costs for the IO pair and inter-chip path combinations for the first and second designs.

2. The method of claim 1, wherein the bipartite matching algorithm is an expanded Munkres algorithm.

3. The method of claim 1, further including specifying a first library for the first design and a second library for the second design.

4. The method of claim 1, wherein forming the inter-chip paths includes:
    for each inter-chip path,
    designating a contact formed by two MBs;
    when the MB is on a front side, adding a through-silicon-via (TSV) pin connected to the MB to a path;
    adding another TSV pin of that TSV to the path; and
    repeating designating the contact, adding the TSV pin, and adding another TSV pin when another contact is present.

5. The method of claim 1, wherein determining the costs of assigning the IO pairs to the inter-chip paths includes:
    calculating locations of IO ports of the IO pairs;
    for each IO pair,
    calculating a first planar distance between one IO port and a head node of its associated inter-chip path;
    multiplying the first planar distance with a redistribution layer weight to get the first cost;
    calculating a second planar distance between another IO port and a tail node of the associated inter-chip path;
    multiplying the second planar distance with a signal layer weight to get the second cost; and
    adding the first and second costs to get a total cost for that IO pair and inter-chip path combination.

6. The method of claim 1, wherein building the cost matrix includes listing total costs for the IO pair and inter-chip path combinations for the first and second designs.

7. A non-transitory computer-readable medium storing computer-executable instructions for generating optimized input/output (IO) pair and inter-chip connection combinations for two chips, which when executed by a computer performs steps comprising:
    specifying a first design for a first chip and a second design for a second chip;
    specifying inter-chip signals based on the first and second designs;
    establishing IO pairs for the first and second chips based on the inter-chip signals;
    forming electrical contacts between micro-bumps (MBs) of the first and second chips;
    forming inter-chip paths with through-silicon-vias (TSVs) and MBs of the first and second chips;
    determining costs of assigning the IO pairs to the inter-chip paths, the costs including a first cost associated with a redistribution layer and a second cost associated with a signal layer;
    building a cost matrix based on the costs; and
    applying a bipartite matching algorithm to the cost matrix to determine the optimized IO pair and inter-chip path combinations
    wherein building the cost matrix includes listing the costs for the IO pair and inter-chip path combinations for the first and second designs.

8. The computer-readable medium of claim 7, wherein the bipartite matching algorithm is an expanded Munkres algorithm.

9. The computer-readable medium of claim 7, further including specifying a first library for the first design and a second library for the second design.

10. The computer-readable medium of claim 7, wherein forming the inter-chip paths includes:
    for each inter-chip path,
    designating a contact formed by two MBs;
    when the MB is on a front side, adding a through-silicon-via (TSV) pin connected to the MB to a path;
    adding another TSV pin of that TSV to the path; and
    repeating designating the contact, adding the TSV pin, and adding another TSV pin when another contact is present.

11. The computer-readable medium of claim 7, wherein determining the costs of assigning the IO pairs to the inter-chip paths includes:
    calculating locations of IC ports of the IO pairs;
    for each IO pair,
    calculating a first planar distance between one IO port and a head node of its associated inter-chip path;
    multiplying the first planar distance with a redistribution layer weight to get the first cost;
    calculating a second planar distance between another IO port and a tail node of the associated inter-chip path;
    multiplying the second planar distance with a signal layer weight to get the second cost; and
    adding the first and second costs to get a total cost for that IO pair and inter-chip path combination.

12. The computer-readable medium of claim 7, wherein building the cost matrix includes listing total costs for the IO pair and inter-chip path combinations for the first and second designs.

13. A system for generating optimized input/output (IO) pair and inter-chip connection combinations for two chips, the system including a processor configured to perform steps comprising:

specifying a first design for a first chip and a second design for a second chip;

specifying inter-chip signals based on the first and second designs;

establishing IO pairs for the first and second chips based on the inter-chip signals;

forming electrical contacts between micro-bumps (MBs) of the first and second chips;

forming inter-chip paths with through-silicon-vias (TSVs) and MBs of the first and second chips;

determining costs of assigning the IO pairs to the inter-chip paths, the costs including a first cost associated with a redistribution layer and a second cost associated with a signal layer;

building a cost matrix based on the costs; and applying a bipartite matching algorithm to the cost matrix to determine the optimized IO pair and inter-chip path combinations wherein building the cost matrix includes listing the costs for the IO pair and inter-chip path combinations for the first and second designs.

14. The system of claim 13, wherein
the bipartite matching algorithm is an expanded Munkres algorithm.

15. The system of claim 13, further including specifying a first library for the first design and a second library for the second design.

16. The system of claim 13, wherein forming the inter-chip paths includes:
for each inter-chip path,
designating a contact formed by two MBs;
when the MB is on a front side, adding a through-silicon-via (TSV) pin connected to the MB to a path;
adding another TSV pin of that TSV to the path; and
repeating designating the contact, adding the TSV pin, and adding another TSV pin when another contact is present.

17. The system of claim 13, wherein determining the costs of assigning the IO pairs to the inter-chip paths includes:
calculating locations of IO ports of the IO pairs;
for each IO pair,
calculating a first planar distance between one IO port and a head node of its associated inter-chip path;
multiplying the first planar distance with a redistribution layer weight to get the first cost;
calculating a second planar distance between another IO port and a tail node of the associated inter-chip path;
multiplying the second planar distance with a signal layer weight to get the second cost; and
adding the first and second costs to get a total cost for that IO pair and inter-chip path combination.

18. The system of claim 13, wherein building the cost matrix includes listing total costs for the IO pair and inter-chip path combinations for the first and second designs.

* * * * *